US012520286B2

United States Patent
Yang et al.

(10) Patent No.: US 12,520,286 B2
(45) Date of Patent: Jan. 6, 2026

(54) DATA TRANSMISSION METHOD AND APPARATUS, AND DEVICE AND STORAGE MEDIUM

(71) Applicant: ZTE CORPORATION, Guangdong (CN)

(72) Inventors: Weiwei Yang, Guangdong (CN); Bo Dai, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 461 days.

(21) Appl. No.: 18/019,882

(22) PCT Filed: Aug. 4, 2021

(86) PCT No.: PCT/CN2021/110622
§ 371 (c)(1),
(2) Date: Feb. 6, 2023

(87) PCT Pub. No.: WO2022/028489
PCT Pub. Date: Feb. 10, 2022

(65) Prior Publication Data
US 2023/0292293 A1     Sep. 14, 2023

(30) Foreign Application Priority Data
Aug. 6, 2020   (CN) .......................... 202010785756.7

(51) Int. Cl.
*H04W 72/0446*     (2023.01)
(52) U.S. Cl.
CPC ............... *H04W 72/0446* (2013.01)

(58) Field of Classification Search
CPC .... H04W 72/0446; H04L 5/0053; H04L 5/14; H04L 5/0044; H04L 5/0064; H04L 5/1469
See application file for complete search history.

(56) References Cited

U.S. PATENT DOCUMENTS

| | | | |
|---|---|---|---|
| 2019/0053227 A1* | 2/2019 | Huang | H04L 5/0094 |
| 2020/0267756 A1* | 8/2020 | Fakoorian | H04W 76/27 |
| 2021/0168849 A1* | 6/2021 | Oh | H04W 72/23 |
| 2021/0337582 A1* | 10/2021 | Kuang | H04W 72/23 |
| 2022/0007361 A1* | 1/2022 | Huang | H04L 5/0094 |
| 2022/0086816 A1* | 3/2022 | Zhang | H04W 72/23 |

(Continued)

FOREIGN PATENT DOCUMENTS

| | | |
|---|---|---|
| CN | 109156014 A | 1/2019 |
| CN | 109802816 A | 5/2019 |

(Continued)

OTHER PUBLICATIONS

Chinese First Search Report from China National Intellectual Property Administration for Application No. 2020107857567, dated Apr. 17, 2024, 4 pages.
Chinese First Review Opinion from China National Intellectual Property Administration for Application No. 2020107857567, dated Apr. 22, 2024, 10 pages.

(Continued)

*Primary Examiner* — Jay P Patel
(74) *Attorney, Agent, or Firm* — KDW FIRM PLLC

(57) ABSTRACT

Provided are a data transmission method and apparatus, a device and a storage medium. The data transmission method includes receiving a signaling sent by a second node and determining a slot format based on the signaling. The slot format is used for data transmission.

18 Claims, 7 Drawing Sheets

(56) References Cited

U.S. PATENT DOCUMENTS

| | | | | |
|---|---|---|---|---|
| 2022/0104216 A1* | 3/2022 | Wu | ............... | H04W 72/535 |
| 2022/0150033 A1* | 5/2022 | Li | ............... | H04L 5/0073 |
| 2022/0217717 A1* | 7/2022 | Kaikkonen | ....... | H04W 56/0005 |
| 2022/0248399 A1* | 8/2022 | You | ............... | H04W 84/04 |
| 2022/0346080 A1* | 10/2022 | Ren | ............... | H04L 5/0053 |

FOREIGN PATENT DOCUMENTS

| | | |
|---|---|---|
| CN | 110519031 A | 11/2019 |
| CN | 111034105 A | 4/2020 |
| CN | 111130727 A | 5/2020 |
| CN | 111934836 A | 11/2020 |
| KR | 20190136655 A | 12/2019 |
| WO | 2020089855 A1 | 5/2020 |
| WO | 2020105180 A1 | 5/2020 |

OTHER PUBLICATIONS

The International Search Report dated Dec. 3, 2021, for PCT/CN2021/110622 (six (6) pages).

Ericsson, "DL signals and channels for NR-U", 3GPP TSG-RAN WG1 Meeting #98bis R1-1910945 Chongqing, China, Aug. 14-20, 2019.

LG Electronics, "Discussion on group common PDCCH," 3GPP TSG R1-1800373, RAN WG1 NR AH1801, Agenda Item: 7.3.1.3: 15 pages (Jan. 2018).

LG Electronics,"Discussions on resource multiplexing amound backhaul and access links," 3GPP TSG R1-1912265, RAN WG1 #99, Agenda Item: 7.2.3.1: 8 pages (Nov. 2019).

Spreadtrum Communications, "Remaining details on group-common PDCCH," 3GPP TSG, R1-1800277, RAN WG1 Meeting AH 1801, Agenda item : 7.3.1.3: 4 pages (Jan. 2018).

Extended European Search Report for EP Application No. 21852746.3, dated Sep. 6, 2024, 14 pages.

* cited by examiner

| Index 1 | Index 5 | Index 8 | Index 7 | Index 6 | Index 5 | Index 12 | Index 0 | Index 15 | Index 20 |

FIG. 4

| Index 1 | Index 5 | Index 8 | Index 7 | Index 6 | Index 5 | Index 12 | Index 0 | Index 15 | Fixed |

FIG. 5

| Index 1 | Index 1 | Index 2 | Index 2 | Index 2 | Index 5 | Index 12 | Index 12 | Index 15 | Index 15 |

FIG. 6

| Index 1 | Index 2 | Index 1 | Index 1 | Index 2 | Index 2 | Index 20 | Index 20 | Index 20 | Index 20 |

FIG. 7

| Index 15 | Index 20 | Index 20 | Index 20 | Index 20 | Fixed | Index 15 | Fixed | Index 15 | Index 20 |

FIG. 8

| Index 15 | Index 20 | Index 20 | Index 20 | Index 20 | Fixed | Index 15 | Fixed | Index 15 | Index 20 |

FIG. 9

DATA TRANSMISSION METHOD AND APPARATUS, AND DEVICE AND STORAGE MEDIUM

CROSS-REFERENCE TO RELATED APPLICATIONS

This is a national stage application filed under 37 U.S.C. 371 based on International Patent Application No. PCT/CN2021/110622, filed Aug. 4, 2021, which claims priority to Chinese Patent Application No. 202010785756.7 filed with the China National Intellectual Property Administration (CNIPA) on Aug. 6, 2020, the disclosures of which are incorporated herein by reference in their entireties.

TECHNICAL FIELD

The present application relates to the field of communication technology, for example, a data transmission method and apparatus, a device and a storage medium.

BACKGROUND

Compared with a conventional communication system, a new radio (NR) system has a higher configuration flexibility and a larger bandwidth range, and accordingly, a higher requirement is imposed on the capability of a terminal. As a result, the terminal needs to spend a higher cost than before.

However, in various scenarios supported by an NR system, not all scenarios require such high terminal capabilities, such as a smart wearable device and an industrial sensor. Thus, low configuration terminal device types are defined for such scenarios, such as a smaller bandwidth, fewer antennas, a half-duplex frequency-division duplex (HD-FDD), the relaxation of a terminal processing time and the relaxation of a terminal processing capability, thereby reducing the production cost and complexity of a terminal.

NR supports flexible slot formats, that is, symbols in a slot may be configured as downlink symbols, uplink symbols or flexible symbols. For an HD-FDD terminal, half-duplex operation may be performed in a manner where a slot format is obtained first, and then whether to receive data on a downlink band or switch to an uplink band to receive data according to the slot format is determined. However, the determination method of a slot format currently used by NR is not entirely suitable for an HD-FDD.

SUMMARY

The present application provides are a data transmission method and apparatus, a device and a storage medium to solve the problem that a slot format supported by NR is not suitable for an HD-FDD terminal.

In a first aspect, an embodiment of the present application provides a data transmission method. The method is applied to a first node and includes receiving a signaling sent by a second node and determining a slot format based on the signaling. The slot format is used for data transmission.

In a second aspect, an embodiment of the present application provides a data transmission method. The method is applied to a second node and includes configuring a signaling and sending the signaling to the first node. The signaling is configured to instruct the first node to determine a slot format. The slot format is used for data transmission.

In a third aspect, an embodiment of the present application provides a data transmission apparatus. The apparatus is configured at the first node and includes a receiving module and a determination module.

The receiving module is configured to receive the signaling sent by the second node.

The determination module is configured to determine the slot format based on the signaling.

In a fourth aspect, an embodiment of the present application provides a data transmission apparatus. The apparatus is configured at the second node and includes a configuration module and a sending module.

The configuration module is configured to configure the signaling.

The sending module is configured to send the signaling to the first node. The signaling is configured to instruct the first node to determine the slot format. The slot format is used for data transmission.

In a fifth aspect, an embodiment of the present application provides a device. The device includes at least one processor and a memory.

The memory is configured to store at least one program.

When executed by the at least one processor, the at least one program causes the at least one processor to perform the method according to any one of the embodiments of the present application.

In a sixth aspect, an embodiment of the present application provides a storage medium. The storage medium stores a computer program. When executing the computer program, a processor performs the method according to any one of the embodiments of the present application.

BRIEF DESCRIPTION OF DRAWINGS

FIG. 4 is a diagram of another slot format according to an embodiment of the present application.

FIG. 5 is a diagram of another slot format according to an embodiment of the present application.

FIG. 6 is a diagram of another slot format according to an embodiment of the present application.

FIG. 7 is a diagram of another slot format according to an embodiment of the present application.

FIG. 8 is a diagram of another slot format according to an embodiment of the present application.

FIG. 9 is a diagram of another slot format according to an embodiment of the present application.

DETAILED DESCRIPTION

Figure 1:
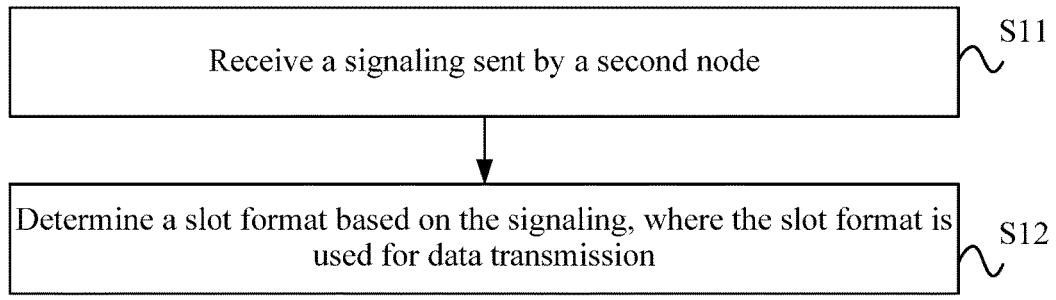
FIG. 1 is a flowchart of a data transmission method according to an embodiment of the present application.

Embodiments of the present application will be described hereinafter in detail with reference to the drawings. It is to be noted that if not in collision, the embodiments and features therein in the present application may be combined with each other.

The steps illustrated in the flowcharts of the drawings may be performed by a computer system such as a group of computers capable of executing instructions. Moreover, although logical sequences are illustrated in the flowcharts, the steps illustrated or described may be performed in sequences different from those described here in some cases.

The technical solutions of the present application may be applied to various communication systems such as the Global System for Mobile Communications (GSM), the code-division multiple access (CDMA) system, the wideband code-division multiple access (WCDMA) system, General Packet Radio Service (GPRS), the Long Term Evolution (LTE) system, the Long Term Evolution-Advanced (LIE-A) system, the Universal Mobile Telecommunications System (UMTS) and the 5th-generation wireless system, and the embodiments of the present application are not limited. In the present application, description is given by using an example of the 5G system.

The embodiments of the present application may be applied to wireless networks of different standards. Wireless access networks may include different communication nodes in different systems. A wireless network system includes a base station and multiple user equipment. The base station performs wireless communication with the multiple user equipment separately.

First, it is to be noted that in the embodiments of the present application, the base station may be a device capable of communicating with a user terminal. The base station may be any device having a wireless receiving-sending function and includes, but is not limited to, a base station (NodeB), an evolved base station (eNodeB), a base station in the 5G communication system, a base station in a future communication system, an access node in a Wireless Fidelity (Wi-Fi) system, a wireless relay node and a wireless backhaul node. The base station may also be a radio controller in a cloud radio access network (C-RAN) scenario. The base station may also be, for example, a Small Cell or a transmission node (transmission reference point (TRP)). The embodiments of the present application are not limited.

In the embodiments of the present application, the user terminal is a device having a wireless receiving-sending function. The device may be deployed on land including indoors, outdoors, handled, wearable or vehicle-mounted; may be deployed on water (for example, on a ship); or may be deployed in the air (for example, on an airplane, balloon or satellite). The user terminal may be a mobile phone, a tablet computer, a computer having a wireless receiving-sending function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city and a wireless terminal in smart home. Application scenarios are not limited in the embodiments of the present application. The user terminal may also sometimes be referred to as a terminal, an access terminal, a UE unit, a UE station, a mobile station, a mobile platform, a remote station, a remote terminal, a mobile device, a UE terminal, a wireless communication device, a UE agent or a UE apparatus. The embodiments of the present application are not limited.

Compared with a conventional communication system, a new radio (NR) system has a higher configuration flexibility and a larger bandwidth range, and accordingly, a higher requirement is imposed on the capability of a terminal. As a result, the terminal needs to spend a higher cost than before. However, in various scenarios supported by an NR system, not all scenarios require such high terminal capabilities, such as a smart wearable device and an industrial sensor. Thus, low configuration terminal device types are defined for such scenarios, such as a smaller bandwidth, fewer antennas, a half-duplex FDD (HD-FDD), the relaxation of a terminal processing time and the relaxation of a terminal processing capability, thereby reducing the production cost and complexity of a terminal. Such terminals may be referred to as low configuration NR terminals or NR reduced capability (NR RedCap) user terminals.

NR supports flexible slot formats, that is, symbols in a slot may be configured as downlink symbols, uplink symbols or flexible symbols. For NR RedCap HD-FDD UE, half-duplex operation may be performed in a manner where a slot format is obtained first, and then whether to receive data on a downlink band or switch to an uplink band to receive data according to the slot format is determined. However, the determination method of a slot format currently used by NR is mainly designed for a time-division duplex (TDD) system and is not entirely suitable for RedCap HD-FDD UE.

First, the configuration method of an NR slot format is briefly described. The configuration below is included.

(1) Semi-Static Cell-Based Configuration

A semi-static cell-based configuration slot format is configured through higher-layer signaling tdd-UL-DL-ConfigurationCommon. This higher-layer signaling provides reference subcarrier spacing corresponding to parameter referenceSubcarrierSpacing and a first mode.

The first mode provides slot configuration period msec corresponding to parameter dl-UL-TransmissionPeriodicity, the number of slots having only downlink symbols corresponding to parameter nrofDownlinkSlots, the number of downlink symbols corresponding to parameter nrofDownlinkSymbols, the number of slots having only uplink symbols corresponding to parameter nrofUplinkSlots and the number of uplink symbols corresponding to parameter nrofUplinkSymbols.

If a second mode is also provided, UE determines the slot format of each slot in a first slot group according to the first mode and determines the slot format of each slot in a second slot group according to the second mode. The second mode provides slot configuration period msec corresponding to parameter dl-UL-TransmissionPeriodicity, the number of slots having only downlink symbols corresponding to parameter nrofDownlinkSlots, the number of downlink symbols corresponding to parameter nrofDownlinkSymbols, the number of slots having only uplink symbols corresponding to parameter nrofUplinkSlots and the number of uplink symbols corresponding to parameter nrofUplinkSymbols.

(2) Semi-Static Terminal-Based Configuration

A semi-static terminal-based configuration slot format is configured through higher-layer signaling tdd-UL-DL-ConfigurationDedicated and contributes to only a cell-based configuration flexible subframe. This higher-layer signaling provides a group of slot configurations corresponding to parameter slotSpecificConfigurationsToAddModList.

Each slot of the group of slot configurations is provided with a slot index corresponding to parameter slotIndex and a group of symbols corresponding to parameter symbols.

If symbols=allDownlink, all symbols in the slot are downlinks.

If symbols=allUplink, all symbols in the slot are Uplinks.

If symbols=explicit, parameter nrofDownlinkSymbols provides the number of downlink symbols in the slot, and the downlink symbols are at the start of the slot; and parameter nrofUplinkSymbols provides the number of uplink symbols in the slot, and the uplink symbols are at the end of the slot.

If no parameter nrofDownlinkSymbols is provided, there is no downlink symbol in the slot. If no parameter nrofUplinkSymbols is provided, there is no uplink symbol in the slot. Remaining symbols in the slot are flexible symbols.

The preceding two configuration methods are applicable to only an NR TDD system.

(3) Dynamic Configuration

The dynamic configuration refers to a downlink control information indication carried by downlink control information (DCI) format2-0, specifically indicating combination index slotFormatCombinationId in the downlink control information and looking up a combination table according to the combination index. The combination table is configured through a high-level signaling.

```
SlotFormatCombination ::=               SEQUENCE {
    slotFormatCombinationId             SlotFormatCombinationId,
    slotFormats                         SEQUENCE (SIZE
(1..maxNrofSlotFormatsPerCombination)) OF INTEGER (0..255)
}
SlotFormatCombinationId   ::=           INTEGER
(0..maxNrofSlotFormatCombinationsPerSet-1)
```

Slot format index combination slotFormats may be obtained through the combination index, and then the format of each slot may be obtained by looking up the table according to a slot format index. The slot format defined in an NR standard is shown in the table below.

TABLE 1

Slot format under a normal cyclic prefix

| Format | \multicolumn{14}{c}{Symbol Index in Slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | F | F | F | U | U |
| 33 | D | D | D | D | D | D | D | D | F | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | D | F | U |

TABLE 1-continued

Slot format under a normal cyclic prefix

| Format | \multicolumn{14}{c}{Symbol Index in Slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56~254 | \multicolumn{14}{c}{Reserved} |
| 255 | \multicolumn{14}{l}{Even if DCI is detected, UE still determines a slot format according to parameter TDD-UL-DL-ConfigurationCommon or TDD-UL-DL-ConfigDedicated.} |

In an embodiment, this embodiment provides a data transmission method. The method is applied to a first node. As shown in FIG. 1, the data transmission method provided by this embodiment mainly includes steps S11, S12 and S13.

In S11, a signaling sent by a second node is received.

In S12, a slot format is determined based on the signaling. The slot format is used for data transmission. In an exemplary embodiment, the signaling includes a first signaling and/or a second signaling.

In an exemplary embodiment, the slot format includes a first slot format determined based on the first signaling and/or a second slot format determined based on the second signaling.

In an exemplary embodiment, the first signaling includes a first slot format index. The first slot format index is an index in a first slot format table, or the first slot format index is an index in a first slot format combination.

In an exemplary embodiment, the first signaling includes at least one of a first slot format index set, a first period or the number of slots corresponding to at least one slot format index in the first slot format index set.

In an exemplary embodiment, the first signaling includes at least one of a first slot format index set, a first period or a slot index corresponding to at least one slot format index in the first slot format index set.

In an exemplary embodiment, the first signaling includes first slot configuration information. The first slot configuration information indicates the slot configuration of H slots. H is a positive integer greater than or equal to 1.

In an exemplary embodiment, the first signaling includes at least one of a first slot configuration information set, a first period or the number of slots corresponding to at least one slot configuration in the first slot configuration information set.

In an exemplary embodiment, the first signaling includes at least one of a first slot configuration information set, a first period or a slot index corresponding to at least one slot configuration in the first slot configuration information set.

In an exemplary embodiment, the first slot configuration information includes at least one of the following parameters: the start symbol and the length of downlink transmission; the start symbol and the length of uplink transmission; the start symbol and the length of flexible transmission; the symbol length of the downlink transmission, where the start position of the downlink transmission is fixed at the start of each slot; the symbol length of the uplink transmission, where the end position of the uplink transmission is fixed at the end of each slot; the number of downlink-only slots; the number of uplink-only slots; or a slot index.

In an exemplary embodiment, the first signaling includes at least one of a first period or second slot configuration information.

In an exemplary embodiment, the second slot configuration information includes at least one of a slot index set or a slot attribute corresponding to at least one slot in the slot index set.

In an exemplary embodiment, the second slot configuration information includes at least one of a slot attribute set or a slot index corresponding to at least one slot attribute in the slot attribute set.

In an exemplary embodiment, the second signaling includes the index of a slot format combination. The slot format combination is composed of a first slot index. The first slot format index is the index in the first slot format table, or the first slot format index is the index in the first slot format combination.

In an exemplary embodiment, the slot format included in the first slot format table or the first slot format combination satisfies at least one of the following conditions: At most one uplink-downlink switching is performed; or in a first preset slot format, if the number of downlink symbols is greater than G1, or the number of uplink symbols is greater than G2, the maximum number of flexible symbols is N. G1, G2 and N are positive integers greater than zero.

In an exemplary embodiment, the slot format included in the first slot format table or the first slot format combination satisfies at least one of the following conditions: At most one uplink-downlink switching is performed; or in the first preset slot format, if the number of downlink symbols is greater than G3, or the number of uplink symbols is greater than G4, the maximum number of flexible symbols is N. G3, G4 and N are positive integers greater than zero.

In an exemplary embodiment, after the slot format is determined based on the signaling, the data transmission method also includes determining a symbol for an uplink-downlink switching.

In an exemplary embodiment, the uplink-downlink switching occurs between a downlink symbol and an uplink symbol, and in the case where uplink-downlink switching spacing corresponding to the first node is R symbols, the symbol for the uplink-downlink switching is determined in one of the following manners: The symbol for the uplink-downlink switching is determined to be R downlink symbols before the uplink symbol; or the symbol for the uplink-downlink switching is determined to be R uplink symbols after the downlink symbol.

In an exemplary embodiment, the uplink-downlink switching occurs on a flexible symbol, the uplink-downlink switching spacing corresponding to the first node is R symbols, and the number of flexible symbols is X.

In the case where R is less than or equal to X, the symbol for the uplink-downlink switching is determined in the following manner. The symbol for the uplink-downlink switching is determined to be the flexible symbol.

Alternatively, in the case where R is greater than X, the symbol for the uplink-downlink switching is determined in one of the following manners: The symbol for the uplink-downlink switching is determined to be the flexible symbol and Y downlink symbols before the flexible symbol; the symbol for the uplink-downlink switching is determined to be the flexible symbol and Y uplink symbols after the flexible symbol; in the case where the number of uplink symbols is greater than the number of downlink symbols within a preset length, the symbol for the uplink-downlink switching is determined to be the flexible symbol and Y uplink symbols after the flexible symbol; in the case where the number of uplink symbols is greater than the number of downlink symbols within the preset length, the symbol for the uplink-downlink switching is determined to be the flexible symbol and Y downlink symbols before the flexible symbol.

The preset length is M slots, and M is a positive integer greater than or equal to 1.

In an exemplary embodiment, after the slot format is determined based on the signaling, the data transmission method also includes generating the symbol for the uplink-downlink switching by the first node based on at least one of the following manners: The first node does not perform downlink receiving on R1 symbol before an uplink symbol; the first node does not perform downlink receiving on R2 symbol after the uplink symbol; the first node does not perform uplink sending on R3 uplink symbol after a downlink symbol; the first node does not perform uplink sending on R4 uplink symbol before the downlink symbol; the first node does not perform uplink-downlink transmission on all flexible symbols between the uplink symbol and the downlink symbol; the first node does not perform downlink receiving on all flexible symbols and Y1 downlink symbol before the uplink symbol; the first node does not perform downlink receiving on all flexible symbols and Y2 downlink symbol after the uplink symbol; the first node does not perform uplink sending on all flexible symbols and Y3 uplink symbol after the downlink symbol; or the first node does not perform uplink sending on all flexible symbols and Y4 uplink symbol before the downlink symbol.

R1, R2, R3, R4, Y1, Y2, Y3 and Y4 are positive integers greater than zero.

Figure 2:
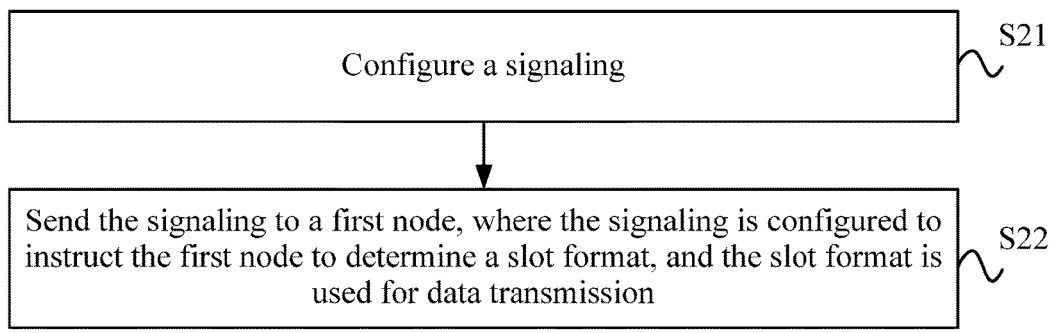
FIG. 2 is a flowchart of a data transmission method according to an embodiment of the present application.

In an embodiment, this embodiment provides a data transmission method. The method is applied to the second node. As shown in FIG. 2, the data transmission method provided by this embodiment mainly includes steps S21 and S22.

In S21, a signaling is configured.

In S22, the signaling is sent to the first node. The signaling is configured to instruct the first node to determine a slot format. The slot format is used for data transmission.

In an exemplary embodiment, the signaling includes a first signaling and/or a second signaling.

In an exemplary embodiment, the slot format includes a first slot format determined based on the first signaling and/or a second slot format determined based on the second signaling.

In an exemplary embodiment, the first signaling includes a first slot format index. The first slot format index is the index in the first slot format table, or the first slot format index is the index in the first slot format combination.

In an exemplary embodiment, the first signaling includes at least one of a first slot format index set, a first period or the number of slots corresponding to at least one slot format index in the first slot format index set.

In an exemplary embodiment, the first signaling includes at least one of a first slot format index set, a first period or a slot index corresponding to at least one slot format index in the first slot format index set.

In an exemplary embodiment, the first signaling includes first slot configuration information. The first slot configuration information indicates the slot configuration of H slots. H is a positive integer greater than or equal to 1.

In an exemplary embodiment, the first signaling includes at least one of a first slot configuration information set, a first period or the number of slots corresponding to at least one slot configuration in the first slot configuration information set.

In an exemplary embodiment, the first signaling includes at least one of a first slot configuration information set, a first period or a slot index corresponding to at least one slot configuration in the first slot configuration information set.

In an exemplary embodiment, the first slot configuration information includes at least one of the following parameters: the start symbol and the length of the downlink transmission; the start symbol and the length of the uplink transmission; the start symbol and the length of the flexible transmission; the symbol length of the downlink transmission, where the start position of the downlink transmission is fixed at the start of each slot; the symbol length of the uplink transmission, where the end position of the uplink transmission is fixed at the end of each slot;

the number of downlink-only slots; the number of uplink-only slots; or a slot index.

In an exemplary embodiment, the first signaling includes at least one of a first period or second slot configuration information.

In an exemplary embodiment, the second slot configuration information includes at least one of a first period, a slot index set or a slot attribute corresponding to at least one slot in the slot index set.

In an exemplary embodiment, the second slot configuration information includes at least one of a first period, a slot attribute set or a slot index corresponding to at least one slot attribute in the slot attribute set.

In an exemplary embodiment, the second signaling includes the index of a slot format combination. The slot format combination is composed of a first slot index. The first slot format index is the index in the first slot format table, or the first slot format index is the index in the first slot format combination.

In an exemplary embodiment, the slot format included in the first slot format table satisfies at least one of the following conditions: At most one uplink-downlink switching is performed; or in the first preset slot format, if the number of downlink symbols is greater than G1, or the number of uplink symbols is greater than G2, the maximum number of flexible symbols is N. G1, G2 and N are positive integers greater than zero.

In an exemplary embodiment, the slot format included in the first slot format table satisfies at least one of the following conditions: At most one uplink-downlink switching is performed; or in the first preset slot format, if the number of downlink symbols is greater than G3, or the number of uplink symbols is greater than G4, the number of flexible symbols is fixed to N. G3, G4 and N are positive integers greater than zero.

In an exemplary embodiment, the first signaling is a signaling based on the semi-static configuration of the first node, and the second signaling is a signaling indicated in downlink control information.

In an embodiment, if a half-duplex terminal is provided with the first signaling by a base station, the terminal receives the first signaling and determines the first slot format according to the first signaling, and the terminal performs uplink-downlink transmission according to at least the first slot format.

The first signaling includes the first slot format index.

The first signaling is a higher-layer signaling configured based on the terminal.

The first slot format index is the corresponding index in the first slot format table. The range of the optional value of the first slot format index is $\{0, \ldots, Qmax\}$.

Figure 3:
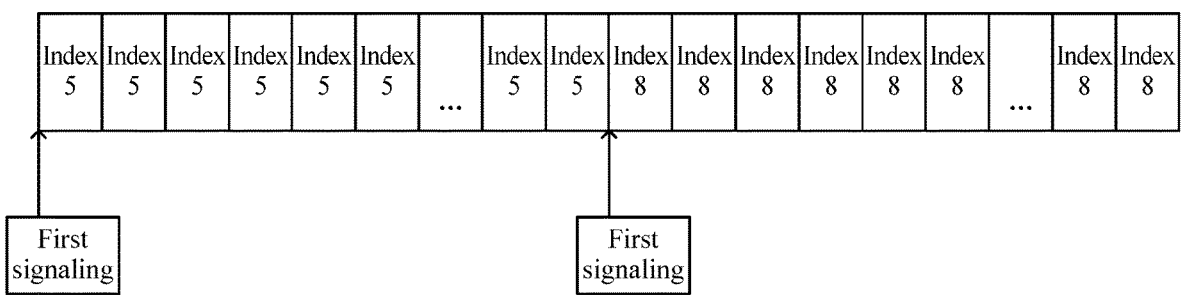
FIG. 3 is a diagram of a slot format according to an embodiment of the present application.

For example, as shown in FIG. 3, it is assumed that UE is provided with the first signaling by the base station, and a first index indicated by the first signaling is index 5, the UE determines the first slot format according to index 5, and the terminal performs the uplink-downlink transmission according to at least the first slot format.

In an embodiment, if the half-duplex terminal is provided with the first signaling by the base station, the terminal receives the first signaling and determines the first slot format according to the first signaling, and the terminal performs the uplink-downlink transmission according to at least the determined first slot format.

The first signaling includes at least one of a first period, a first slot format set or the number of slots corresponding to at least one slot format index in the first slot format index set.

The first period uses a slot or a radio frame as a basic unit.

The first slot format index is the corresponding index in the first slot format table, and the range of the optional value is $\{0, \ldots, Qmax\}$.

The first signaling is the higher-layer signaling configured based on the terminal.

For example, it is assumed that the first signaling includes the first period which is 10 slots, and index 1, index 5, index 8, index 7, index 6, index 5, index 12, index 0, index 15 and index 20, the UE determines the first slot format according to the first signaling. As shown in FIG. 4, the terminal performs the uplink-downlink transmission according to at least the first slot format.

For example, it is assumed that the first signaling includes the first period which is 10 slots, and index 1, index 5, index 8, index 7, index 6, index 5, index 12, index 0 and index 15, the UE determines the first slot format according to the first signaling. As shown in FIG. 5, the slot format of the last slot in the first period is fixed as one of downlink-only, uplink-only or flexible-only. The terminal performs the uplink-downlink transmission according to at least the first slot format.

For example, it is assumed that the first signaling includes the first period which is 10 slots, and index 1, index 2, index 5, index 12 and index 15, where the number of slots corresponding to index 1 is 2, the number of slots corresponding to index 2 is 3, the number of slots corresponding to index 5 is 1, the number of slots corresponding to index 12 is 2, and the number of slots corresponding to index 15 is 2, the UE determines the first slot format according to the first signaling. As shown in FIG. 6, the terminal performs the uplink-downlink transmission according to at least the first slot format.

In an embodiment, if the half-duplex terminal is provided with the first signaling by the base station, the terminal receives the first signaling and determines the first slot format according to the first signaling, and the terminal performs the uplink-downlink transmission according to at least the determined first slot format.

The first signaling includes at least one of a first period, a first slot format set or a slot index corresponding to at least one slot format index in the first slot format index set.

The first period uses a slot or a radio frame as the basic unit. The first slot format index is the index in the first slot format table, and the range of the optional value is $\{0, \ldots, Qmax\}$. The first signaling is the higher-layer signaling configured based on the terminal.

For example, it is assumed that the first signaling includes the first period which is 10 slots, and slot format index 1 corresponding to slot indexes 1, 3 and 4, slot format index 2 corresponding to slot indexes 2, 5 and 6 and slot format index 20 corresponding to slot indexes 7, 8, 9 and 10, the UE determines the first slot format according to the first signaling. As shown in FIG. 7, the terminal performs the uplink-downlink transmission according to at least the first slot format.

For example, it is assumed that the first signaling includes the first period which is 10 slots, and slot format index 15 corresponding to slot indexes 1, 7 and 9 and slot format index 20 corresponding to slot indexes 2, 3, 4 and 5, the UE determines the first slot format according to the first signaling. As shown in FIG. 8, the slot formats corresponding to slot 6 and slot 8 that are not indicated in the first period are fixed as one of downlink-only, uplink-only or flexibility-only, and the terminal performs the uplink-downlink transmission according to at least the first slot format.

For example, it is assumed that the first signaling includes the first period which is 10 slots, and slot format index 15 corresponding to a slot index indicating 1000001010 and slot format index 20 corresponding to a slot index indicating 0111100000, the UE determines the first slot format according to the first signaling. A slot index is given in the form of a bitmap, each bit corresponds to each index in the first period. As shown in FIG. 9, the slot formats corresponding to slot 6 and slot 8 that are not indicated in the first period are fixed as one of downlink-only, uplink-only or flexibility-only, and the terminal performs the uplink-downlink transmission according to at least the first slot format.

In an embodiment, if the half-duplex terminal is provided with the first signaling by the base station, the terminal receives the first signaling and determines the first slot format according to the first signaling, and the terminal performs the uplink-downlink transmission according to at least the determined first slot format.

The first signaling includes at least one of a first slot configuration.

The first slot configuration is based on H slots. H is a positive integer greater than or equal to 1.

The first slot configuration includes at least one of the following parameters: the start symbol and the length of downlink transmission; the start symbol and the length of uplink transmission; the start symbol and the length of flexible transmission; the symbol length of the downlink transmission, where the start position of the downlink transmission is fixed at the start of each slot; the symbol length of the uplink transmission, where the end position of the uplink transmission is fixed at the end of each slot; the number of downlink-only slots; the number of uplink-only slots; or a slot index.

For example, it is assumed that the first signaling includes first slot configuration 1, that is, the start symbol of the downlink transmission is symbol 0, and the length is 5.

Figure 10:
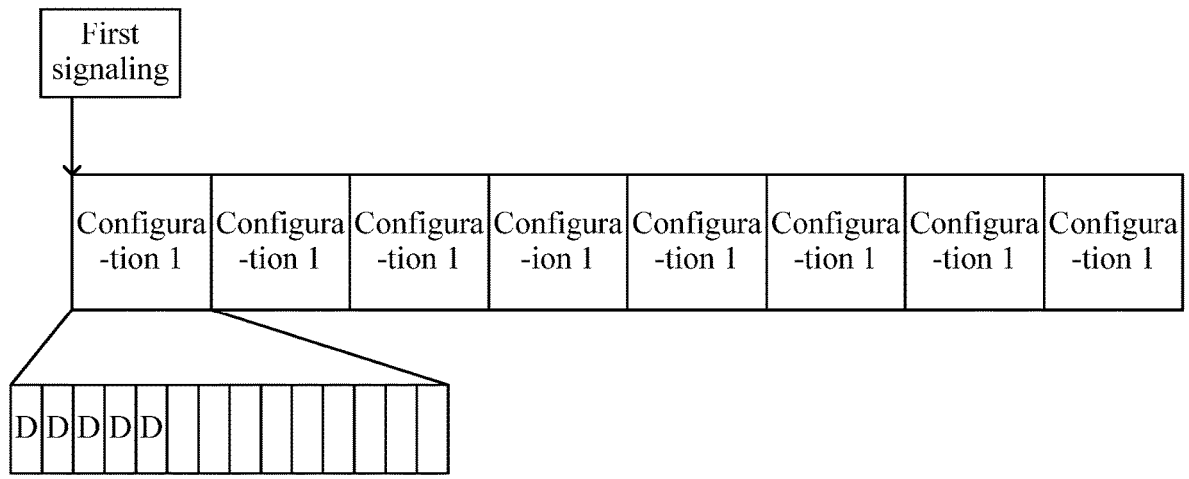
FIG. 10 is a diagram of another slot format according to an embodiment of the present application.

It is assumed that a slot configuration is based on 1 slot, the UE determines the first slot format according to the first signaling. As shown in FIG. 10, the first 5 symbols of each slot are the symbols for the downlink transmission, and other symbols are the symbols for flexible transmission. The terminal performs the uplink-downlink transmission according to at least the first slot format.

For example, it is assumed that the first signaling includes first slot configuration 2, that is, the start symbol of the uplink transmission is symbol 10, and the length is 4.

Figure 11:
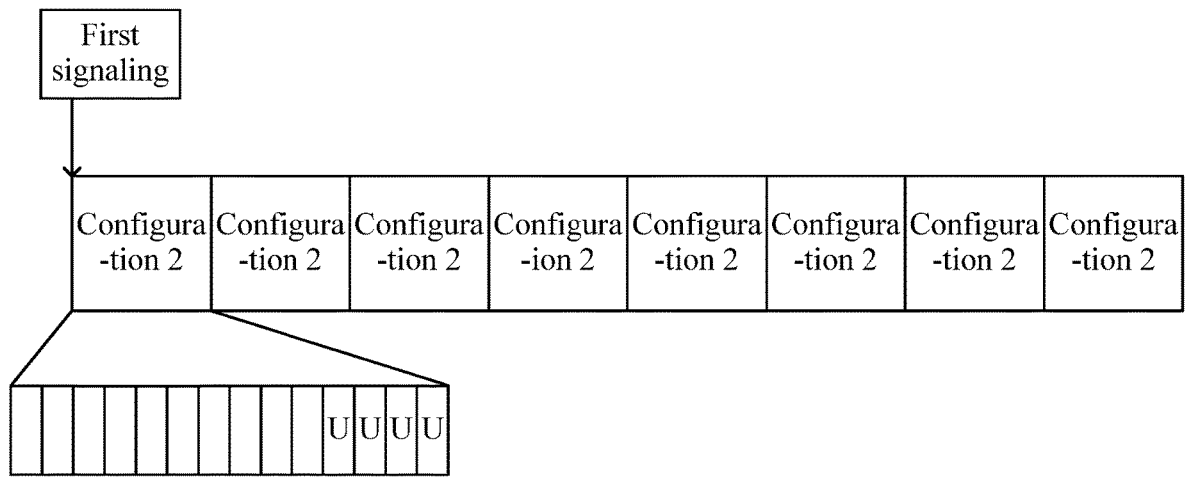
FIG. 11 is a diagram of another slot format according to an embodiment of the present application.

It is assumed that a slot configuration is based on 1 slot, the UE determines the first slot format according to the first signaling. As shown in FIG. 11, the last 4 symbols of each slot are the symbols for the uplink transmission, and other symbols are the symbols for the flexible transmission. The terminal performs the uplink-downlink transmission according to at least the first slot format.

For example, it is assumed that the first signaling includes first slot configuration 3, that is, the start symbol of the flexible transmission is symbol 4, and the length is 8.

Figure 12:
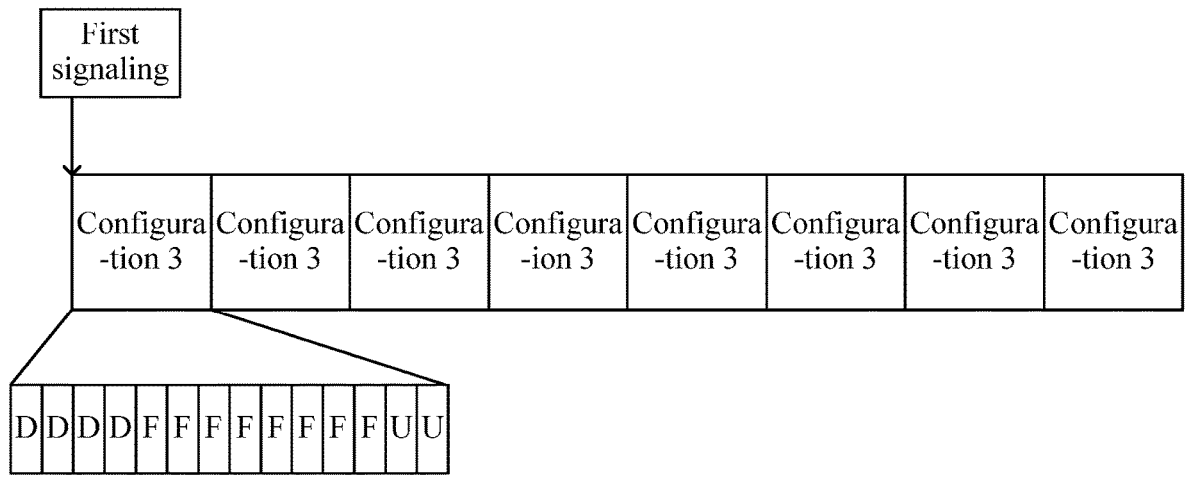
FIG. 12 is a diagram of another slot format according to an embodiment of the present application.

It is assumed that a slot configuration is based on 1 slot, the UE determines the first slot format according to the first signaling. As shown in FIG. 12, 8 symbols starting from symbol 4 of each slot are symbols for the flexible transmission, the symbol before the flexible transmission is the symbol for the downlink transmission, and the symbol after the flexible transmission is the symbol for the uplink transmission. The terminal performs the uplink-downlink transmission according to at least the first slot format.

For example, it is assumed that the first signaling includes first slot configuration 4, that is, the length of the downlink transmission is 5.

Figure 13:
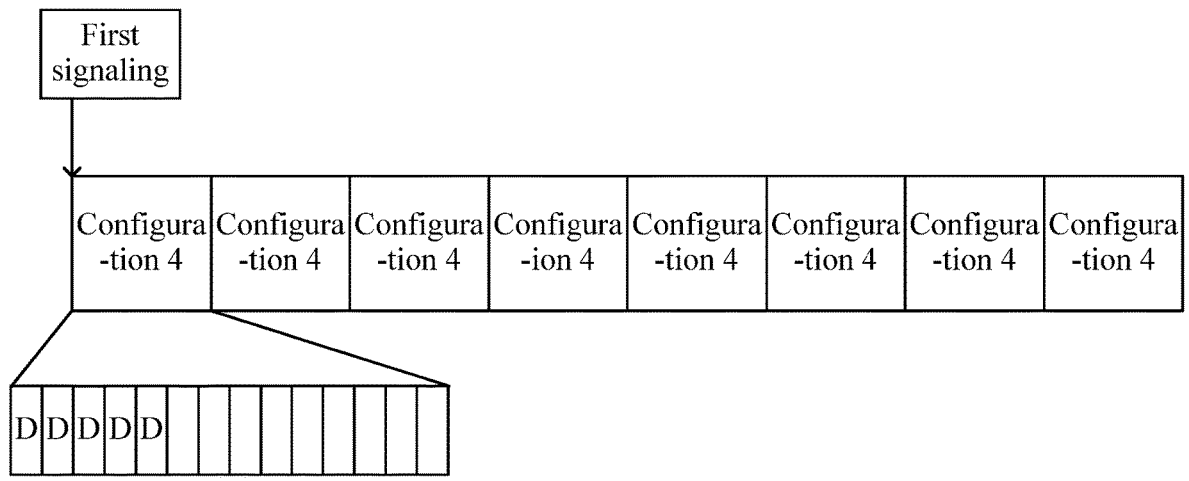
FIG. 13 is a diagram of another slot format according to an embodiment of the present application.

It is assumed that a slot configuration is based on 1 slot, the UE determines the first slot format according to the first signaling. As shown in FIG. 13, the first 5 symbols of each slot are the symbols for the downlink transmission, and other symbols are the symbols for the flexible transmission. The terminal performs the uplink-downlink transmission according to at least the first slot format.

For example, it is assumed that the first signaling includes first slot configuration 5, that is, the length of the uplink transmission is 4.

Figure 14:
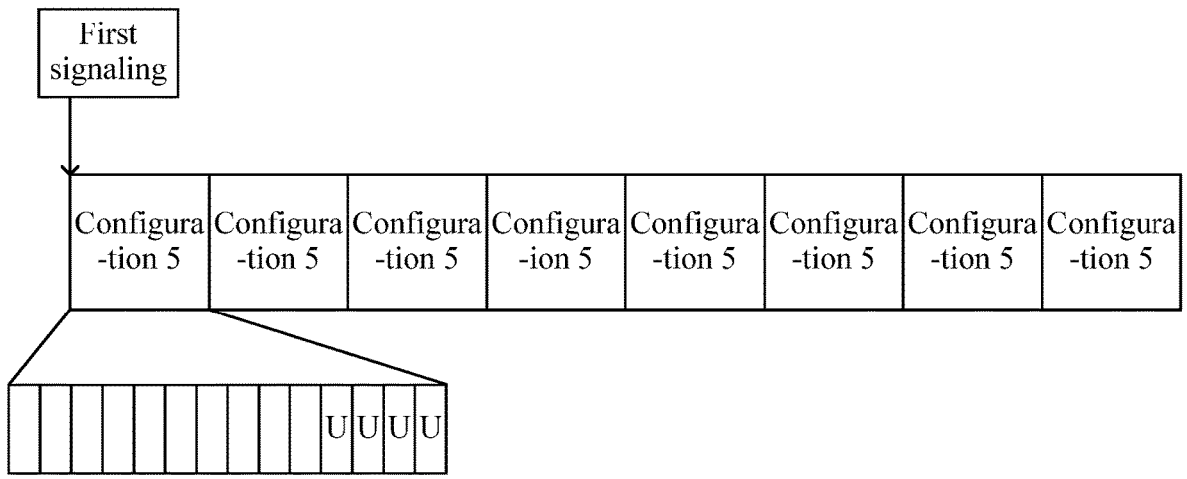
FIG. 14 is a diagram of another slot format according to an embodiment of the present application.

It is assumed that a slot configuration is based on 1 slot, the UE determines the first slot format according to the first signaling. As shown in FIG. 14, the last 4 symbols of each slot are the symbols for the uplink transmission, and other symbols are the symbols for the flexible transmission. The terminal performs the uplink-downlink transmission according to at least the first slot format.

Figure 15:
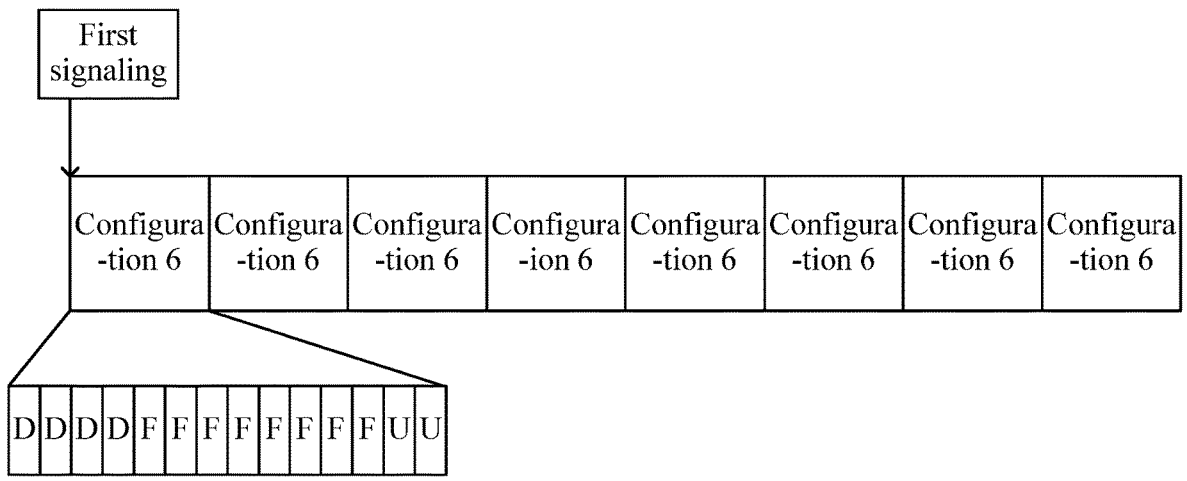
FIG. 15 is a diagram of another slot format according to an embodiment of the present application.

For example, it is assumed that the first signaling includes first slot configuration 6, that is, the length of the downlink transmission is 4, and the length of the uplink transmission is 2. It is assumed that a slot configuration is based on 1 slot, the UE determines the first slot format according to the first signaling. As shown in FIG. 15, the first 4 symbols are the symbols for the downlink transmission, the last 2 symbols are the symbols for the uplink transmission, and other symbols are the symbols for the flexible transmission. The terminal performs the uplink-downlink transmission according to at least the first slot format.

Figure 16:
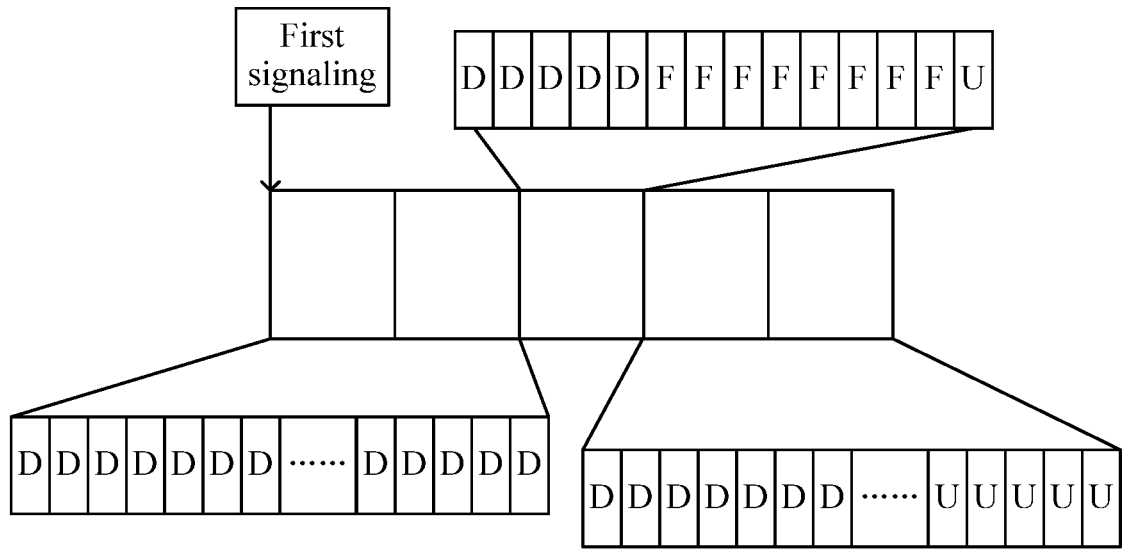
FIG. 16 is a diagram of another slot format according to an embodiment of the present application.

For example, it is assumed that the first signaling includes first slot configuration 7, that is, H=5, the number of downlink subframes is 2, the number of uplink subframes is 2, the number of downlink symbols is 5, and the number of uplink symbols is 1, the UE determines the first slot format according to the first signaling. As shown in FIG. 16, the first 5 symbols are the symbols for the downlink transmission, the last 1 symbol is the symbols for the uplink transmission, and other symbols are the symbols for the flexible transmission. The terminal performs the uplink-downlink transmission according to at least the first slot format.

In an embodiment, if the half-duplex terminal is provided with the first signaling by the base station, the terminal receives the first signaling and determines the first slot format according to the first signaling, and the terminal performs the uplink-downlink transmission according to at least the determined first slot format.

The first signaling includes at least one of a first period, a first slot configuration set or the number of slots corresponding to at least one slot configuration in the first slot configuration set.

The first period uses a slot or a radio frame as the basic unit. The first signaling is the higher-layer signaling configured based on the terminal.

For example, it is assumed that the first signaling includes the first period which is 10 slots, and first slot configuration 1, first slot configuration 2, first slot configuration 3, first slot configuration 4, first slot configuration 5, first slot configuration 6, first slot configuration 7, first slot configuration 8, first slot configuration 9 and first slot configuration 10, the UE determines the first slot format according to the first signaling. The terminal performs the uplink-downlink transmission according to at least the first slot format.

For example, it is assumed that the first signaling includes the first period which is 10 slots, and first slot configuration 1, first slot configuration 2, first slot configuration 3, first slot configuration 4 and first slot configuration 5, where the number of slots corresponding to the first slot configuration is 2, the number of slots corresponding to first slot configuration 2 is 3, the number of slots corresponding to first slot configuration 3 is 1, the number of slots corresponding to first slot configuration 4 is 2, and the number of slots corresponding to first slot configuration 5 is 2, the UE determines the first slot format according to the first signaling. The terminal performs the uplink-downlink transmission according to at least the first slot format.

For example, it is assumed that the first signaling includes the first period which is 10 slots, and first slot configuration 1, first slot configuration 2, first slot configuration 3 and first slot configuration 4, where the number of slots corresponding to the first slot configuration is 2, the number of slots corresponding to first slot configuration 2 is 3, the number of slots corresponding to first slot configuration 3 is 1, and the number of slots corresponding to first slot configuration 4 is 2, the UE determines a first uplink-downlink configuration according to the first signaling. The terminal performs the uplink-downlink transmission according to at least the first slot format. The first signaling does not include the slot configurations of the last two slots in the first period, and the slot configurations of the 2 slots are fixed as downlink transmission, uplink transmission or flexible transmission.

In an embodiment, if the half-duplex terminal is provided with the first signaling by the base station, the terminal receives the first signaling and determines the first slot format according to the first signaling, and the terminal performs the uplink-downlink transmission according to at least the determined first slot format.

The first signaling includes at least one of a first period, a first slot configuration set or a slot index corresponding to at least one slot configuration in the first slot configuration set.

The first signaling is the higher-layer signaling configured based on the terminal.

The first period uses a slot or a radio frame as the basic unit.

For example, it is assumed that the first signaling includes the first period which is 10 slots; first slot configuration 1, first slot configuration 2, first slot configuration 3 and first slot configuration 4; and slot index 1, 2 and 3 corresponding to first slot configuration 1, slot index 4 corresponding to first slot configuration 2, slot index 6, 7 and 8 corresponding to first slot configuration 3 and slot index 9 and 10 corresponding to first slot configuration 4, the UE determines the first slot format according to the first signaling. The terminal performs the uplink-downlink transmission according to at least the first slot format.

For example, it is assumed that the first signaling includes the first period which is 10 slots, and first slot configuration 1, first slot configuration 2, first slot configuration 3 and first slot configuration 4, where the slot index corresponding to first slot configuration 1 indicates 1110000000, the slot index corresponding to first slot configuration 2 indicates 0001000000, the slot index corresponding to first slot configuration 3 indicates 0000011100, and the slot index corresponding to first slot configuration 4 indicates 0000000011, the UE determines the first slot format according to the first signaling. A slot index performs indication in a manner of a bitmap, bit 1 indicates that the slot adopts the slot configuration, bit 0 indicates that the slot does not adopt the slot configuration, and vice versa. The terminal performs the uplink-downlink transmission according to at least the first slot format.

For example, it is assumed that the first signaling includes the first period which is 10 slots, and first slot configuration 1, first slot configuration 2, first slot configuration 3 and first slot configuration 4, where the slot index corresponding to first slot configuration 1 indicates 1100000000, the slot index corresponding to first slot configuration 2 indicates 0001000000, the slot index corresponding to first slot configuration 3 indicates 0000011100, and the slot index corresponding to first slot configuration 4 indicates 0000000011, the UE determines the first slot format according to the first signaling. A slot index performs indication in a manner of a bitmap, bit 1 indicates that the slot adopts the slot configuration, bit 0 indicates that the slot does not adopt the slot configuration, and vice versa. The first signaling does not include the slot configuration of slot index 3, and the slot configuration of the slot is fixed as downlink-only, uplink-only or flexible-only. The terminal performs the uplink-downlink transmission according to at least the first slot format.

In an embodiment, if the half-duplex terminal is provided with the first signaling by the base station, the terminal receives the first signaling and determines the first slot format according to the first signaling, and the terminal performs the uplink-downlink transmission according to at least the determined first slot format.

The first signaling includes at least one of a first period and a second slot configuration.

The second slot configuration indicates the slot configuration of H slots. H is a positive integer greater than or equal to 1.

The second slot configuration includes a slot index set or a slot attribute corresponding to at least one slot in the slot index set.

The slot attribute includes {downlink-only, uplink-only, configurable}.

The first period uses a slot or a radio frame as the basic unit.

When the slot attribute is configurable, the slot attribute needs to be determined through at least one of the following parameters: the number of downlink symbols, the number of uplink symbols and the number of flexible symbols.

For example, it is assumed that the first signaling includes the first period which is 10 slots, and the second slot configuration, that is, slot index 1: downlink-only, slot index 2: downlink-only, and slot index 8: downlink-only, the UE determines the first slot format according to the first signaling. The first signaling does not include the slot attributes of slot indexes 3, 4, 5, 6, 7, 9 and 10 in the first period, and the slot attributes of these slots are fixed as downlink-only, uplink-only or flexible-only. The terminal performs the uplink-downlink transmission according to at least the first slot format.

In an embodiment, if the half-duplex terminal is provided with the first signaling by the base station, the terminal determines the first slot format according to the first signaling. The terminal performs the uplink-downlink transmission according to at least the determined first slot format.

The first signaling includes at least one of a first period or a second slot configuration.

The second slot configuration indicates the slot configuration of H slots. H is a positive integer greater than or equal to 1.

The first period uses a slot or a radio frame as the basic unit.

The second slot configuration includes a slot attribute set or a slot index corresponding to at least one slot attribute in the slot attribute set.

The slot attribute includes {downlink-only, uplink-only, configurable}.

When the slot attribute is configurable, the slot attribute needs to be determined through at least one of the following parameters: the number of downlink symbols, the number of uplink symbols or the number of flexible symbols.

For example, it is assumed that the first signaling includes the first period which is 10 slots, and the second slot configuration, that is, downlink-only, slot index 1, 2 and 3; configurable, slot index 4, 5 and 6; and downlink-only, slot index 7, 8, 9 and 10, the UE determines the first slot format according to the first signaling. The terminal performs the uplink-downlink transmission according to at least the first slot format.

For example, it is assumed that the first signaling includes the first period which is 10 slots, and the second slot configuration, that is, downlink-only, slot index 1, 2 and 3; and downlink-only, slot index 7, 8, 9 and 10, the UE determines the first slot format according to the first signaling. The first signaling does not include the slot attributes of slot indexes 4, 5 and 6 in the first period, and the slot attributes of these slots are fixed as downlink-only, uplink-only or flexible-only. The terminal performs the uplink-downlink transmission according to at least the first slot format.

For example, it is assumed that the first signaling includes the first period which is 10 slots, and the second slot configuration, that is, downlink-only, a slot index indicates 1110000000; and downlink-only, a slot index indicates 0000001111, the UE determines the first slot format according to the first signaling. The first signaling does not include the slot attributes of slot indexes 4, 5 and 6 in the first period, and the slot attributes of these slots are fixed as downlink-only, uplink-only or flexible-only. The terminal performs the uplink-downlink transmission according to at least the first slot format.

In an embodiment, the half-duplex terminal receives the second signaling and determines the second slot format according to the second signaling. The terminal performs uplink-downlink transmission according to at least the determined second slot format.

The second signaling includes at least the index of a slot format combination.

The index of the slot format combination is an index in a combination table configured through a high-level signaling.

The second slot format is determined according to the second signaling in the following manner: A specific slot combination is obtained according to the slot combination index, and the second slot format is obtained according to the slot format index in the slot combination. The first slot format index is the index in the first slot format table.

For example, the UE receives the second signaling. The second signaling includes at least index 3 of a slot format combination.

The slot format combination content is shown in Table 2.

TABLE 2

A slot format combination content table

| Combination Index | Combination Content |
|---|---|
| 0 | 1 5 6 8 26 37 7 255 |
| 1 | 1 9 16 8 26 37 1 1 |
| 2 | 1 1 1 1 1 1 1 1 |
| 3 | 2 2 1 1 2 2 1 1 |
| 4 | 3 3 3 3 3 3 3 3 |
| ... | ... |

The slot combination obtained by the terminal is 2 2 1 1 2 2 1 1. The second slot format is obtained according to the first slot format table, and uplink-downlink transmission is performed according to the second slot format.

In an embodiment, the half-duplex terminal receives the first signaling and the second signaling and determines the first slot format and the second slot format according to the first signaling and the second signaling. The terminal performs the uplink-downlink transmission according to at least the determined first slot format and the determined second slot format.

The first signaling is a semi-static signaling based on the terminal. The second signaling is a dynamic signaling carried in downlink control information.

In an embodiment, the half-duplex terminal receives the first signaling and the second signaling and determines the first slot format and the second slot format according to the first signaling and the second signaling. The terminal performs the uplink-downlink transmission according to at least the determined first slot format and the determined second slot format.

The first signaling is the semi-static signaling based on the terminal. The second signaling is the dynamic signaling carried in the downlink control information.

The transmission direction of a flexible symbol in the first slot format is determined according to the second slot format.

In an embodiment, the half-duplex terminal receives the first signaling and the second signaling and determines the first slot format and the second slot format according to the first signaling and the second signaling. The terminal performs the uplink-downlink transmission according to at least the determined first slot format and the determined second slot format.

The first signaling is the semi-static signaling based on the terminal. The second signaling is the dynamic signaling carried in the downlink control information.

The terminal performs the uplink-downlink transmission according to at least the determined first slot format and the determined second slot format in the following manner. The transmission direction of a flexible symbol in the first slot format is determined according to the second slot format.

In an embodiment, the half-duplex terminal receives the first signaling and the second signaling and determines the first slot format and the second slot format according to the first signaling and the second signaling. The terminal performs the uplink-downlink transmission according to at least the determined first slot format and the determined second slot format.

The terminal performs the uplink-downlink transmission according to at least the determined first slot format and the determined second slot format in the following manner. The uplink-downlink transmission of a predefined slot is determined according to the first slot format. The uplink-downlink transmission of other slots is determined according to the second slot format. The predefined slot is a slot specified by the base station and the terminal in advance, or a slot in which the first signaling is located or a slot in which the second signaling is located.

In an embodiment, the difference between the first slot format table and a second slot format table is at least one of the following: The first slot format table does not support the slot format in which two uplink-downlink switching exist in a slot, while the second slot format table needs to support this slot format; the slot format coexisting with LTE does not need to be considered in the first slot format table, while this slot format needs to be considered in the second slot format table; or a slot format suitable for the uplink-downlink switching spacing of the terminal needs to be added in the first slot format table.

The second slot format table is a slot format table used by the existing NR system.

For example, the first slot format table does not support the slot format in which two uplink-downlink switching exist in a slot, that is, the first slot format table does not support the 8 slot formats shown in Table 3.

TABLE 3

| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | D | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |

For example, the slot format coexisting with the LTE does not need to be considered in the first slot format table, that is, the first slot format table does not support the 3 slot formats shown in Table 4.

TABLE 4

| 43 | D | D | D | D | D | D | D | D | F | F | F | F | U |
| 44 | D | D | D | D | D | F | F | F | F | F | F | U | U |
| 45 | D | D | D | D | D | F | F | U | U | U | U | U | U |

For example, the slot format suitable for the uplink-downlink switching spacing of the terminal needs to be added in the first slot format table. Specifically, for the slot format of a downlink symbol, a flexible symbol and an uplink symbol:

1. When the number of downlink symbols in a slot is greater than G1, G1=3 is used as an example, and at least one group in the slot format of Table 5 is added.

TABLE 5

| D | D | D | D | D | D | D | D | D | F | F | F | F | U |
|---|---|---|---|---|---|---|---|---|---|---|---|---|---|
| D | D | D | D | D | D | D | D | F | F | F | F | U | U |
| D | D | D | D | D | D | D | D | F | F | F | F | F | U |
| D | D | D | D | D | D | D | F | F | F | F | F | U | U |
| D | D | D | D | D | D | D | F | F | F | F | F | F | U |
| D | D | D | D | D | D | F | F | F | F | F | F | U | U |
| D | D | D | D | D | D | F | F | F | F | F | F | F | U |
| D | D | D | D | D | F | F | F | F | F | F | F | U | U |
| D | D | D | D | D | F | F | F | F | F | F | F | F | U |
| D | D | D | D | F | F | F | F | F | F | F | F | U | U |

2. When the number of uplink symbols in a slot is greater than G2, G2=3 is used as an example, and at least one group in the slot format of Table 6 is added.

TABLE 6

| D | F | F | F | F | U | U | U | U | U | U | U | U | U |
|---|---|---|---|---|---|---|---|---|---|---|---|---|---|
| D | D | F | F | F | F | U | U | U | U | U | U | U | U |
| D | D | D | F | F | F | F | U | U | U | U | U | U | U |
| D | F | F | F | F | F | U | U | U | U | U | U | U | U |
| D | D | F | F | F | F | F | U | U | U | U | U | U | U |
| D | D | D | F | F | F | F | F | U | U | U | U | U | U |
| D | F | F | F | F | F | F | U | U | U | U | U | U | U |
| D | D | F | F | F | F | F | F | U | U | U | U | U | U |
| D | D | D | F | F | F | F | F | F | U | U | U | U | U |
| D | F | F | F | F | F | F | F | U | U | U | U | U | U |
| D | D | F | F | F | F | F | F | F | U | U | U | U | U |
| D | D | D | F | F | F | F | F | F | F | U | U | U | U |

In an embodiment, the slot format included in the first slot format table or the first slot format combination satisfies at least one of the following conditions: At most one uplink-downlink switching is performed; or in the first preset slot format, if the number of downlink symbols is greater than G1, or the number of uplink symbols is greater than G2, the maximum number of flexible symbols is N. G1, G2 and N are positive integers greater than zero. The first preset slot format is a slot format composed of a downlink symbol, a flexible symbol and an uplink symbol.

N=4 and G1 and G2=3 is used as an example, specifically as shown in Table 7 or Table 8. Specifically, the specific description is below.

At most one uplink-downlink switching is performed, that is, the first slot format table includes only at least one of a slot format corresponding to a downlink-only symbol, an uplink-only symbol, a flexible-only symbol, a downlink symbol and a flexible symbol, a flexible symbol and an uplink symbol or a downlink symbol, a flexible symbol and an uplink symbol. Table 7 or Table 8 is used as an example. Index 0 corresponds to the slot format of the downlink-only symbol. Index 1 corresponds to the slot format of the uplink-only symbol. Index 2 corresponds to the slot format of the flexible-only symbol. Index 3 to index 7 and index 16 to index 18 correspond to the slot format of the downlink symbol and the flexible symbol. Index 8 to index correspond to the slot format of the flexible symbol and the uplink symbol. Index 19 to index 47 correspond to the slot format of the downlink symbol, the flexible symbol and the uplink symbol.

When the slot format includes one uplink-downlink switching, and the number of downlink symbols in the slot is greater than G1, the maximum number of flexible symbols is N. Specifically, Table 7 or Table 8 is used as an example, index 19 to index 47 correspond to the slot format of one uplink-downlink switching. The number of downlink symbols corresponding to index 28 to index 33 and index 43 to index 44 is greater than 3. In these slot formats, the number of flexible symbols is from 1 to 4, that is, the maximum number of flexible symbols is 4.

When the slot format includes one uplink-downlink switching, and the number of uplink symbols in the slot is greater than G1, the maximum number of flexible symbols is N. Specifically, Table 7 or Table 8 is used as an example, index 19 to index 47 correspond to the slot format of one uplink-downlink switching. The number of uplink symbols corresponding to index 34 to index 42 and index 45 to index 47 is greater than 3. In these slot formats, the number of flexible symbols is from 1 to 4, that is, the maximum number of flexible symbols is 4.

The correspondence relationship between the preceding indexes and the preceding slot formats is only an example, and other correspondence relationships are not excluded. The correspondence relationship that satisfies the preceding conditions for determining a specific slot format protected by the present application is within the scope of the present application.

The preceding embodiments are described by using the first slot format table as an example and may also be described in the form of the first slot format combination.

TABLE 7

| | Slot format under a normal cyclic prefix | | | | | | | | | | | | | |
|---|---|---|---|---|---|---|---|---|---|---|---|---|---|---|
| | Symbol Index in Slot | | | | | | | | | | | | | |
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |

TABLE 7-continued

Slot format under a normal cyclic prefix

| Format | Symbol Index in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | D | F | F | F | F | F | U | U |
| 45 | D | F | F | F | F | U | U | U | U | U | U | U | U | U |
| 46 | D | D | F | F | F | F | U | U | U | U | U | U | U | U |
| 47 | D | D | D | F | F | F | F | U | U | U | U | U | U | U |
| 56~255 | | | | | | Reserved | | | | | | | | |

Alternatively

TABLE 8

Slot format under a normal cyclic prefix

| Format | Symbol Index in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |

TABLE 8-continued

Slot format under a normal cyclic prefix

| Format | Symbol Index in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | D | D | F | F | F | F | U | U |
| 45 | D | F | F | F | F | U | U | U | U | U | U | U | U | U |
| 46 | D | D | F | F | F | F | U | U | U | U | U | U | U | U |
| 47 | D | D | D | F | F | F | F | U | U | U | U | U | U | U |
| 56~254 | Reserved | | | | | | | | | | | | | |
| 255 | Even if the second signaling is detected, a slot format is still determined according to the first signaling. | | | | | | | | | | | | | |

In an embodiment, the slot format included in the first slot format table or the first slot format combination satisfies at least one of the following conditions: At most one uplink-downlink switching is performed; or in the first preset slot format, if the number of downlink symbols is greater than G3, or the number of uplink symbols is greater than G4, the number of flexible symbols is fixed to N. G3, G4 and N are positive integers greater than zero. The first preset slot format is the slot format composed of a downlink symbol, a flexible symbol and an uplink symbol.

N=4 and G3 and G4=3 is taken as an example, and the specific description is shown in Table 9 or Table 10.

At most one uplink-downlink switching is performed, that is, the first slot format table includes only at least one of a slot format corresponding to a downlink-only symbol, an uplink-only symbol, a flexible-only symbol, a downlink symbol and a flexible symbol, a flexible symbol and an uplink symbol or a downlink symbol, a flexible symbol and an uplink symbol. Table 9 or Table 10 is taken as an example. Index 0 corresponds to the slot format of the downlink-only symbol. Index 1 corresponds to the slot format of the uplink-only symbol. Index 2 corresponds to the slot format of the flexible-only symbol. Index 3 to index 7 and index 16 to index 18 correspond to the slot format of the downlink-only symbol and the flexible symbol. Index 8 to index 15 correspond to the slot format of the flexible symbol and the uplink symbol. Index 19 to index 32 correspond to the slot format of the downlink symbol, the flexible symbol and the uplink symbol.

When the slot format includes one uplink-downlink switching, and the number of downlink symbols in the slot is greater than G3, the number of flexible symbols is equal to N. Specifically, Table 9 or Table 10 is taken as an example, and index 19 to index 32 correspond to the slot format of one uplink-downlink switching. The number of downlink symbols corresponding to index 28 to index 29 is greater than 3. In these slot formats, the number of flexible symbols is 4, that is, the number of flexible symbols is equal to 4.

When the slot format includes one uplink-downlink switching, and the number of uplink symbols in the slot is greater than G4, the number of flexible symbols is equal to N. Specifically, Table 9 or Table 10 is taken as an example, and index 19 to index 32 correspond to the slot format of one uplink-downlink switching. The number of uplink symbols corresponding to index 30 to index 32 is greater than 3. In these slot formats, the number of flexible symbols is 4, that is, the number of flexible symbols is equal to 4.

The correspondence relationship between the preceding indexes and the preceding slot formats is only an example, and other correspondence relationships are not excluded. The correspondence relationship that satisfies the preceding conditions for determining a specific slot format protected by the present application is within the scope of the present application.

The preceding embodiments are described by using the first slot format table as an example and may also be in the form of the first slot format combination.

TABLE 9

Slot format under a normal cyclic prefix

| Format | \multicolumn{14}{c}{Symbol Index in Slot} |
|---|---|---|---|---|---|---|---|---|---|---|---|---|---|---|

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | F | F | F | F | F | F | F | F | F | F | U | U | U |
| 27 | D | D | D | F | F | F | F | F | F | F | U | U | U | U |
| 28 | D | D | D | D | D | D | D | D | F | F | F | F | F | U |
| 29 | D | D | D | D | D | D | D | F | F | F | F | F | U | U |
| 30 | D | F | F | F | F | U | U | U | U | U | U | U | U | U |
| 31 | D | D | F | F | F | F | U | U | U | U | U | U | U | U |
| 32 | D | D | D | F | F | F | F | U | U | U | U | U | U | U |
| 33~255 | \multicolumn{14}{c}{Reserved} |

Alternatively

TABLE 10

Slot format under a normal cyclic prefix

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |

TABLE 10-continued

Slot format under a normal cyclic prefix

| Format | Symbol Index in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 27 | D | D | D | F | F | F | F | F | F | F | F | U | U | U |
| 28 | D | D | D | D | D | D | D | D | D | F | F | F | F | U |
| 29 | D | D | D | D | D | D | D | D | F | F | F | F | U | U |
| 30 | D | F | F | F | F | U | U | U | U | U | U | U | U | U |
| 31 | D | D | F | F | F | F | U | U | U | U | U | U | U | U |
| 32 | D | D | D | F | F | F | F | U | U | U | U | U | U | U |
| 33~254 | Reserved | | | | | | | | | | | | | |
| 255 | Even if the second signaling is detected, a slot format is still determined according to the first signaling. | | | | | | | | | | | | | |

In an embodiment, the first slot format table is composed of the second slot format table and an extension table. The extension table includes a slot format suitable for the uplink-downlink switching spacing of the terminal and specifically includes at least one of slot formats in Table 5 and Table 6. An example is given in Table 11. Description is given by using an example in which 5 flexible symbols in Table 5 and Table 6 are selected as the symbols for an uplink-downlink switching. Specifically, index 0 to index 55 and index 255 are the slot formats in the second slot format table, and index 56 to index 60 are the extension table.

TABLE 11

Slot format under a normal cyclic prefix

| Format | Symbol Index in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | F | F | U |
| 29 | D | D | D | D | D | D | D | D | D | D | F | F | F | U |
| 30 | D | D | D | D | D | D | D | D | D | F | F | F | F | U |
| 31 | D | D | D | D | D | D | D | D | D | D | F | F | U | U |
| 32 | D | D | D | D | D | D | D | D | D | F | F | F | U | U |
| 33 | D | D | D | D | D | D | D | D | F | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | F | F | F | F | F | F | U |
| 44 | D | D | D | D | D | F | F | F | F | F | F | F | U | U |

TABLE 11-continued

Slot format under a normal cyclic prefix

| Format | Symbol Index in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | U | U | U | D | D | D | D | D | D | D |
| 56 | D | D | D | D | D | D | D | D | F | F | F | F | F | U |
| 57 | D | D | D | D | D | D | D | F | F | F | F | F | U | U |
| 58 | D | F | F | F | F | F | U | U | U | U | U | U | U | U |
| 59 | D | D | F | F | F | F | U | U | U | U | U | U | U | U |
| 60 | D | D | D | F | F | F | F | F | U | U | U | U | U | U |
| 51~254 | Reserved | | | | | | | | | | | | | |
| 255 | Even if DCI is detected, UE still determines a slot format according to parameter TDD-UL-DL-ConfigurationCommon or TDD-UL-DL-ConfigDedicated. | | | | | | | | | | | | | |

In an embodiment, the terminal performs uplink-downlink transmission according to at least the slot format in the following manner. The terminal determines the symbol for an uplink-downlink switching.

Further, if the uplink-downlink switching occurs between a downlink symbol and an uplink symbol, and it is assumed that uplink-downlink switching spacing corresponding to the half-duplex terminal is R symbols, the symbol for the uplink-downlink switching is the following: in manner one, R downlink symbols before the uplink symbol; or in manner two, R uplink symbols after the downlink symbol.

Further, if the uplink-downlink switching occurs on a flexible symbol, and it is assumed that the uplink-downlink switching spacing corresponding to the half-duplex terminal is R symbols, and the number of flexible symbols is X, the symbol for the uplink-downlink switching is described below.

If R≤X, the flexible symbols are used as the symbol for the uplink-downlink switching.

If R>X, there are three manners below.

In manner one, the flexible symbol and Y downlink symbols before the flexible symbol are used for the uplink-downlink switching.

Alternatively, in manner two, the flexible symbol and Y uplink symbols after the flexible symbol are used for the uplink-downlink switching.

Alternatively, in manner three, when the number of uplink symbols is greater than the number of downlink symbols within the preset length, manner two is adopted, otherwise, manner one is adopted, where the preset length is M slots, and M is a positive integer greater than zero.

In an embodiment, the terminal performs the uplink-downlink transmission according to at least the slot format in the following manner. The terminal generates the symbol for the uplink-downlink switching based on at least one of the following manners: The terminal does not perform downlink receiving on R1 symbol before an uplink symbol; the terminal does not perform uplink sending on R3 uplink symbol after a downlink symbol; the terminal does not perform uplink-downlink transmission on all flexible symbols between the uplink symbol and the downlink symbol; the terminal does not perform downlink receiving on all flexible symbols and Y1 downlink symbol before the uplink symbol; or the terminal does not perform uplink sending on all flexible symbols and Y3 uplink symbol after the downlink symbol.

R1, R3, Y1 and Y3 are positive integers greater than zero.

In an embodiment, the terminal performs the uplink-downlink transmission according to at least the slot format in the following manner. The terminal generates the symbol for the uplink-downlink switching based on at least one of the following manners: The terminal does not perform the downlink receiving on R1 symbol before the uplink symbol; the terminal does not perform downlink receiving on R2 symbol after the uplink symbol; the terminal does not perform the uplink sending on R3 uplink symbol after the downlink symbol; the terminal does not perform uplink sending on R4 uplink symbol before the downlink symbol; the terminal does not perform the uplink-downlink transmission on all flexible symbols between the uplink symbol and the downlink symbol; the terminal does not perform the downlink receiving on all flexible symbols and Y1 downlink symbol before the uplink symbol; the terminal does not perform downlink receiving on all flexible symbols and Y2 downlink symbol after the uplink symbol; the terminal does not perform the uplink sending on all flexible symbols and Y3 uplink symbol after the downlink symbol; or the terminal does not perform uplink sending on all flexible symbols and Y4 uplink symbol before the downlink symbol.

R1, R2, R3, R4, Y1, Y2, Y3 and Y4 are positive integers greater than zero.

Figure 17:
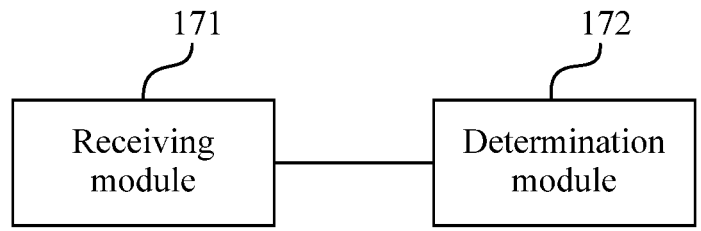
FIG. 17 is a diagram illustrating the structure of a data transmission apparatus according to an embodiment of the present application.

In an embodiment, this embodiment provides a data transmission apparatus. The apparatus is configured at the first node. As shown in FIG. 17, the data transmission apparatus provided by this embodiment mainly includes a receiving module 171 and a determination module 172.

The receiving module 171 is configured to receive the signaling sent by the second node.

The determination module 172 is configured to determine a slot format based on a higher-layer signaling. The slot format is used for data transmission.

In an exemplary embodiment, the signaling includes a first signaling and/or a second signaling.

In an exemplary embodiment, the slot format includes a first slot format determined based on the first signaling and/or a second slot format determined based on the second signaling.

In an exemplary embodiment, the first signaling includes the first slot format index. The first slot format index is the index in the first slot format table, or the first slot format index is the index in the first slot format combination.

In an exemplary embodiment, the first signaling includes one or more of a first slot format index set, a first period or the number of slots corresponding to at least one slot format index in the first slot format index set.

In an exemplary embodiment, the first signaling includes at least one of a first slot format index set, a first period or a slot index corresponding to at least one slot format index in the first slot format index set.

In an exemplary embodiment, the first signaling includes the first slot configuration information. The first slot configuration information indicates the slot configuration of H slots. H is a positive integer greater than or equal to 1.

In an exemplary embodiment, the first signaling includes at least one of a first slot configuration information set, a first period or the number of slots corresponding to at least one slot configuration in the first slot configuration information set.

In an exemplary embodiment, the first signaling includes at least one of a first slot configuration information set, a first period or a slot index corresponding to at least one slot configuration in the first slot configuration information set.

In an exemplary embodiment, the first slot configuration information includes at least one of the following parameters: the start symbol and the length of downlink transmission; the start symbol and the length of uplink transmission; the start symbol and the length of flexible transmission; the symbol length of the downlink transmission, where the start position of the downlink transmission is fixed at the start of each slot; the symbol length of the uplink transmission, where the end position of the uplink transmission is fixed at the end of each slot; the number of downlink-only slots; the number of uplink-only slots; or a slot index.

In an exemplary embodiment, the first signaling includes at least one of a first period or second slot configuration information.

In an exemplary embodiment, the second slot configuration information includes at least one of a slot index set or a slot attribute corresponding to at least one slot index in the slot index set.

In an exemplary embodiment, the second slot configuration information includes at least one of a slot attribute set or a slot index corresponding to at least one slot attribute in the slot attribute set.

In an exemplary embodiment, the second signaling includes the index of a slot format combination. The slot format combination is composed of the first slot index. The first slot format index is the index in the first slot format table, or the first slot format index is the index in the first slot format combination.

In an exemplary embodiment, the slot format included in the first slot format table or the first slot format combination satisfies at least one of the following conditions: At most one uplink-downlink switching is performed; or in the first preset slot format, if the number of downlink symbols is greater than G1, or the number of uplink symbols is greater than G2, the maximum number of flexible symbols is N. G1, G2 and N are positive integers greater than zero.

In an exemplary embodiment, the slot format included in the first slot format table or the first slot format combination satisfies at least one of the following conditions: At most one uplink-downlink switching is performed; or in the first preset slot format, if the number of downlink symbols is greater than G3, or the number of uplink symbols is greater than G4, the number of flexible symbols is fixed to N. G3, G4 and N are positive integers greater than zero.

In an exemplary embodiment, after the slot format is determined based on the signaling, the data transmission method also includes determining the symbol for an uplink-downlink switching.

In an exemplary embodiment, the uplink-downlink switching occurs between a downlink symbol and an uplink symbol, and in the case where uplink-downlink switching spacing corresponding to the first node is R symbols, the symbol for the uplink-downlink switching is determined in one of the following manners: The symbol for the uplink-downlink switching is determined to be R downlink symbols before the uplink symbol; or the symbol for the uplink-downlink switching is determined to be R uplink symbols after the downlink symbol.

In an exemplary embodiment, the uplink-downlink switching occurs on a flexible symbol, the uplink-downlink switching spacing corresponding to the first node is R symbols, and the number of flexible symbols is X.

When R is less than or equal to X, the symbol for the uplink-downlink switching is determined in the following manner. The symbol for the uplink-downlink switching is determined to be the flexible symbol.

Alternatively, in the case where R is greater than X, the symbol for the uplink-downlink switching is determined in one of the following manners: The symbol for the uplink-downlink switching is determined to be the flexible symbol and Y downlink symbols before the flexible symbol; the symbol for the uplink-downlink switching is determined to be the flexible symbol and Y uplink symbols after the flexible symbol; in the case where the number of uplink symbols is greater than the number of downlink symbols within the preset length, the symbol for the uplink-downlink switching is determined to be the flexible symbol and Y uplink symbols after the flexible symbol; in the case where the number of uplink symbols is greater than the number of downlink symbols within the preset length, the symbol for the uplink-downlink switching is determined to be the flexible symbol and Y downlink symbols before the flexible symbol.

The preset length is M slots, and M is a positive integer greater than or equal to 1.

In an exemplary embodiment, the first node performs data transmission according to the slot format in the following manner. The first node generates the symbol for uplink-downlink switching based on at least one of the following manners: The first node does not perform downlink receiving on R1 symbol before an uplink symbol; the first node does not perform downlink receiving on R2 symbol after the uplink symbol; the first node does not perform uplink sending on R3 uplink symbol after a downlink symbol; the first node does not perform uplink sending on R4 uplink symbol before the downlink symbol; the first node does not perform uplink-downlink transmission on all flexible symbols between the uplink symbol and the downlink symbol; the first node does not perform downlink receiving on all flexible symbols and Y1 downlink symbol before the uplink symbol; the first node does not perform downlink receiving on all flexible symbols and Y2 downlink symbol after the uplink symbol; the first node does not perform uplink sending on all flexible symbols and Y3 uplink symbol after the downlink symbol; or the first node does not perform uplink sending on all flexible symbols and Y4 uplink symbol before the downlink symbol.

R1, R2, R3, R4, Y1, Y2, Y3 and Y4 are positive integers greater than zero.

Figure 18:
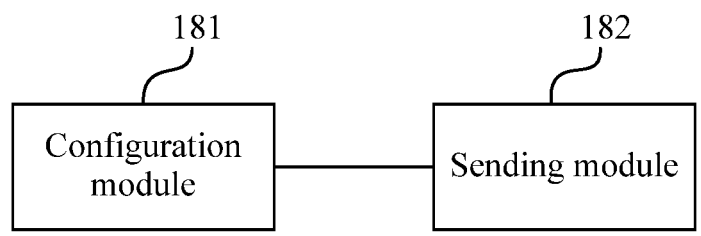
FIG. 18 is a diagram illustrating the structure of a data transmission apparatus according to an embodiment of the present application.

In an embodiment, this embodiment provides a data transmission apparatus. The apparatus is configured at the second node. As shown in FIG. 18, the data transmission apparatus provided by this embodiment mainly includes a configuration module 181 and a sending module 182.

The configuration module 181 is configured to configure a signaling.

The sending module 182 is configured to send the signaling to the first node. The signaling is configured to instruct the first node to determine a slot format. The slot format is used for data transmission.

In an exemplary embodiment, the signaling includes a first signaling and/or a second signaling.

In an exemplary embodiment, the slot format includes a first slot format determined based on the first signaling and/or a second slot format determined based on the second signaling.

In an exemplary embodiment, the first signaling includes the first slot format index. The first slot format index is the index in the first slot format table, or the first slot format index is the index in the first slot format combination.

In an exemplary embodiment, the first signaling includes at least one of a first slot format index set, a first period or the number of slots corresponding to at least one slot format index in the first slot format index set.

In an exemplary embodiment, the first signaling includes at least one of a first slot format index set, a first period or a slot index corresponding to at least one slot format index in the first slot format index set.

In an exemplary embodiment, the first signaling includes the first slot configuration information.

The first slot configuration information indicates the slot configuration of H slots. H is a positive integer greater than or equal to 1.

In an exemplary embodiment, the first signaling includes at least one of a first slot configuration information set, a first period or the number of slots corresponding to at least one slot configuration in the first slot configuration information set.

In an exemplary embodiment, the first signaling includes at least one of a first slot configuration information set, a first period or a slot index corresponding to at least one slot configuration in the first slot configuration information set.

In an exemplary embodiment, the first slot configuration information includes at least one of the following parameters: the start symbol and the length of downlink transmission; the start symbol and the length of uplink transmission; the start symbol and the length of flexible transmission; the symbol length of the downlink transmission, where the start position of the downlink transmission is fixed at the start of each slot; the symbol length of the uplink transmission, where the end position of the uplink transmission is fixed at the end of each slot; the number of downlink-only slots; the number of uplink-only slots; or a slot index.

In an exemplary embodiment, the first signaling includes at least one of a first period or second slot configuration information.

In an exemplary embodiment, the second slot configuration information includes at least one of a slot index set or a slot attribute corresponding to at least one slot index in the slot index set.

In an exemplary embodiment, the second slot configuration information includes at least one of a slot attribute set or a slot index corresponding to at least one slot attribute in the slot attribute set.

In an exemplary embodiment, the second signaling includes the index of a slot format combination. The slot format combination is composed of the first slot index. The first slot format index is the index in the first slot format table.

In an exemplary embodiment, the slot format included in the first slot format table satisfies at least one of the following conditions: At most one uplink-downlink switching is performed; or in the slot format of one uplink-downlink switching, the maximum number of flexible symbols is N. G1, G2 and N are positive integers greater than zero.

In an exemplary embodiment, the slot format included in the first slot format table or the first slot format combination satisfies at least one of the following conditions: At most one uplink-downlink switching is performed; or in the first preset slot format, if the number of downlink symbols is greater than G3, or the number of uplink symbols is greater than G4, the number of flexible symbols is fixed to N. G3, G4 and N are positive integers greater than zero.

The data transmission apparatus provided by this embodiment may execute the data transmission method provided by any embodiment of the present disclosure and has functional modules and beneficial effects corresponding to the method executed. For technical details not described in detail in this embodiment, reference may be made to the data transmission method according to any embodiment of the present disclosure.

It is to be noted that units and modules involved in the embodiment of the preceding data transmission apparatus are just divided according to functional logic, and the division is not limited to this, as long as the corresponding functions can be implemented. In addition, the specific names of the each functional unit are just intended for distinguishing, and are not to limit the protection scope of the present application.

Figure 19:
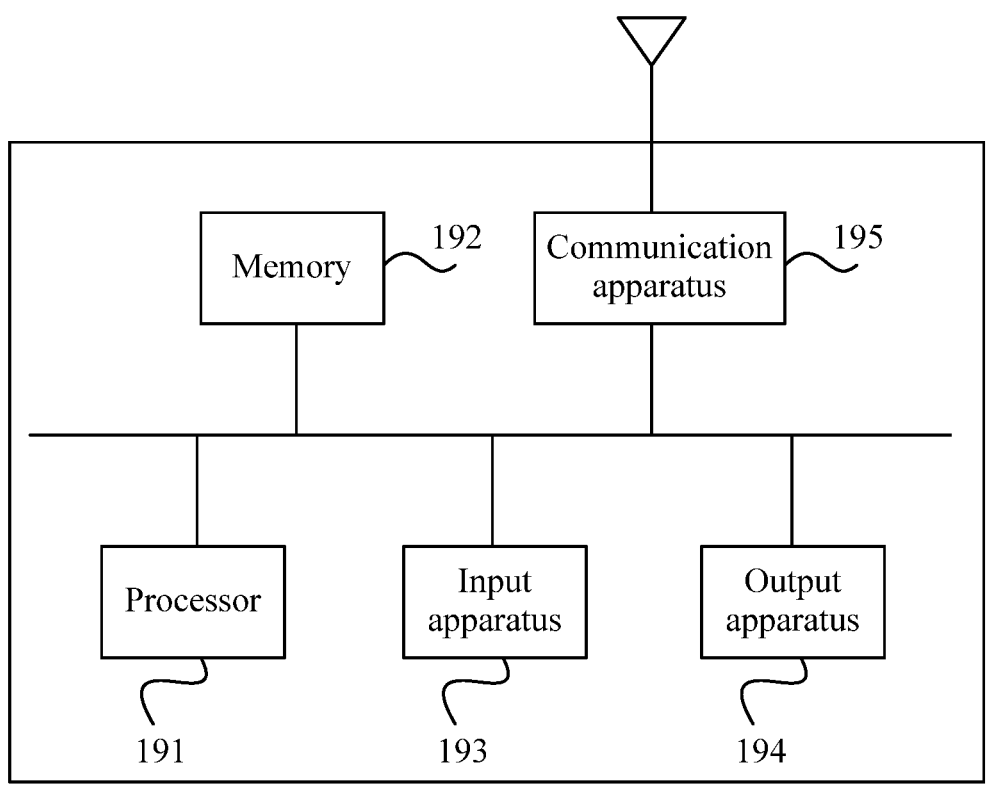
FIG. 19 is a diagram illustrating the structure of a device according to an embodiment of the present application.

An embodiment of the present application provides a device. FIG. 19 is a diagram illustrating the structure of a device according to an embodiment of the present application. As shown in FIG. 19, the device includes a processor 191, a memory 192, an input apparatus 193, an output apparatus 194 and a communication apparatus 195. At least one processor 191 may be disposed in the device, and one processor 191 is used as an example in FIG. 19. The processor 191, the memory 192, the input apparatus 193 and the output apparatus 194 in the device may be connected by a bus or other modes. Connecting by a bus is used as an example in FIG. 19.

As a computer-readable storage medium, the memory 192 is used for storing software programs and computer-executable programs and modules. The processor 191 runs the software programs, instructions and modules stored in the memory 192 to execute function applications and data processing of the device, that is, to perform any method provided by the embodiments of the present application.

The memory 192 may mainly include a program storage region and a data storage region, where the program storage region may store an operating system and an application program required by at least one function while the data storage region may store data created depending on the use of a device. Additionally, the memory 192 may include a high-speed random access memory and may also include a non-volatile memory, for example, at least one magnetic disk memory and flash memory or other non-volatile solid-state memories. In some examples, the memory 192 may also include memories located remotely relative to the processor 191, and these remote memories may be connected to the device via a network. Examples of the preceding network include, but are not limited to, the Internet, an intranet, a network, a communication network and a combination thereof.

The input apparatus 193 may be used for receiving inputted digital or character information and for generating soft key signal input related to user settings and function control of the device. The output apparatus 194 may include a display device, for example, a display screen.

A communication apparatus 195 may include a receiver and a sender. The communication apparatus 195 is configured to perform information transceiving communication under the control of the processor 191.

In an exemplary embodiment, this embodiment of the present application provides a storage medium including computer-executable instructions. The computer-executable instructions are configured to perform a data transmission method when executed by a computer processor. The method is applied to the first node and includes receiving the signaling sent by the second node and determining a slot format based on the signaling. The slot format is used for data transmission.

Of course, in a storage medium including computer-executable instructions provided by this embodiment of the present application, the computer-executable instructions may execute not only the preceding method operations but also related operations in the data transmission method provided by any embodiment of the present application.

In an exemplary embodiment, this embodiment of the present application provides a storage medium including computer-executable instructions. The computer-executable instructions are configured to perform a data transmission method when executed by the computer processor.

The method is applied to the second node and includes configuring a signaling and sending the signaling to the first node. The higher-layer signaling is configured to instruct the first node to determine a slot format. The slot format is used for data transmission.

Of course, in a storage medium including computer-executable instructions provided by this embodiment of the present application, the computer-executable instructions may execute not only the preceding method operations but also related operations in the data transmission method provided by any embodiment of the present application.

From the preceding description of embodiments, it is to be clearly understood by those skilled in the art that the present application may be implemented by software and necessary general-purpose hardware or may also be implemented by hardware. Based on this understanding, the technical solutions of the present application may be embodied in the form of a software product. The software product in a computer may be stored in a computer-readable storage medium such as a floppy disk, read-only memory (ROM), random-access memory (RAM), flash memory, hard disk or optical disk in the computer and includes multiple instructions for enabling a computer device (which may be a personal computer, a server or a network device) to execute the method in each embodiment of the present application.

The preceding description is only exemplary embodiments of the present application and is not intended to limit the scope of the present application.

It is to be understood by those skilled in the art that the term "user terminal" covers any suitable type of radio UE, for example, a mobile phone, a portable data processing apparatus, a portable web browser or a vehicle-mounted mobile station.

In general, multiple embodiments of the present application may be implemented in hardware, a dedicated circuit, software, logic or any combination thereof. For example, some aspects may be implemented in hardware while other aspects may be implemented in firmware or software that may be performed by a controller, a microprocessor or other computing apparatuses, though the present application is not limited thereto.

The embodiments of the present application may be implemented by computer program instructions executed by a data processor of a mobile apparatus, for example, in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of at least one programming language.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for a local technical environment and may be implemented using any suitable data storage technology, such as, but not limited to, a read-only memory (ROM), a random access memory (RAM) and an optical memory apparatus and system (a digital video disc (DVD) or a compact disc (CD)). Computer-readable media may include a non-transitory storage medium. The data processor may be of any type suitable for the local technical environment, such as, but is not limited to, a general-purpose computer, a special-purpose computer, a microprocessor, a digital signal processor (DSP), an application specific integrated circuit (ASIC), a field-programmable gate array (FPGA) and a processor based on a multi-core processor architecture.

What is claimed is:

1. A data transmission method, the method being applied to a first node and comprising:
   receiving a signaling sent by a second node; and
   determining a slot format based on the signaling, wherein the slot format is used for data transmission;
   after determining the slot format based on the signaling, the method further comprises:
   determining a symbol for an uplink-downlink switching;
   wherein the uplink-downlink switching occurs on a flexible symbol, uplink-downlink switching spacing corresponding to the first node is R symbols, and a number of flexible symbols is X;
   in a case where R is less than or equal to X, determining the symbol for the uplink-downlink switching comprises determining that the symbol for the uplink-downlink switching is the flexible symbol; or
   in a case where R is greater than X, determining the symbol for the uplink-downlink switching comprises one of the following:
   determining that the symbol for the uplink-downlink switching is the flexible symbol and Y downlink symbols before the flexible symbol;
   determining that the symbol for the uplink-downlink switching is the flexible symbol and Y uplink symbols after the flexible symbol;

in a case where a number of uplink symbols is greater than a number of downlink symbols within a preset length, determining that the symbol for the uplink-downlink switching is the flexible symbol and the Y uplink symbols after the flexible symbol; or in the case where the number of uplink symbols is greater than the number of downlink symbols within the preset length, determining that the symbol for the uplink-downlink switching is the flexible symbol and the Y downlink symbols before the flexible symbol, wherein the preset length is M slots, wherein M is a positive integer greater than or equal to 1, and R, X and Y are positive integers greater than or equal to 1.

2. The method according to claim 1, wherein the signaling comprises at least one of a first signaling or a second signaling.

3. The method according to claim 2, wherein the slot format comprises at least one of the following:
a first slot format determined based on the first signaling; or
a second slot format determined based on the second signaling.

4. The method according to claim 2, wherein the first signaling comprises a first slot format index, wherein the first slot format index is an index in a first slot format table, or the first slot format index is an index in a first slot format combination.

5. The method according to claim 2, wherein the first signaling comprises at least one of a first slot format index set, a first period, or a number of slots corresponding to at least one slot format index in the first slot format index set; or
the first signaling comprises at least one of a first slot format index set, a first period, or a slot index corresponding to at least one slot format index in the first slot format index set.

6. The method according to claim 2, wherein the first signaling comprises first slot configuration information, wherein the first slot configuration information indicates a slot configuration of H slots, wherein H is a positive integer greater than or equal to 1.

7. The method according to claim 2, wherein the first signaling comprises at least one of a first slot configuration information set, a first period, or a number of slots corresponding to at least one slot configuration in the first slot configuration information set; or
the first signaling comprises at least one of a first slot configuration information set, a first period, or a slot index corresponding to at least one slot configuration in the first slot configuration information set.

8. The method according to claim 6, wherein the first slot configuration information comprises at least one of the following parameters:
a start symbol and a length of downlink transmission;
a start symbol and a length of uplink transmission;
a start symbol and a length of flexible transmission;
a symbol length of downlink transmission, wherein a start position of the downlink transmission is fixed at a start of each slot;
a symbol length of uplink transmission, wherein an end position of the uplink transmission is fixed at an end of each slot;
a number of downlink-only slots;
a number of uplink-only slots; or
a slot index.

9. The method according to claim 2, wherein the first signaling comprises at least one of a first period or second slot configuration information.

10. The method according to claim 9, wherein the second slot configuration information comprises at least one of a slot index set or a slot attribute corresponding to at least one slot index in the slot index set.

11. The method according to claim 9, wherein the second slot configuration information comprises at least one of a slot attribute set or a slot index corresponding to at least one slot attribute in the slot attribute set.

12. The method according to claim 2, wherein the second signaling comprises an index of a slot format combination, wherein the slot format combination is composed of at least one first slot format index, wherein a first slot format index of the at least one first slot format index is an index in a first slot format table, or the first slot format index is an index in a first slot format combination.

13. The method according to claim 4, wherein a slot format comprised in the first slot format table or the first slot format combination satisfies at least one of the following conditions:
at most one uplink-downlink switching is performed; or
in a first preset slot format, in a case where a number of downlink symbols is greater than G1, or a number of uplink symbols is greater than G2, a maximum number of flexible symbols is N, wherein G1, G2 and N are positive integers greater than zero.

14. The method according to claim 4, wherein a slot format comprised in the first slot format table or the first slot format combination satisfies at least one of the following conditions:
at most one uplink-downlink switching is performed; or
in a first preset slot format, in a case where a number of downlink symbols is greater than G3, or a number of uplink symbols is greater than G4, a number of flexible symbols is fixed to N, wherein G3, G4 and N are positive integers greater than zero.

15. The method according to claim 1, wherein the uplink-downlink switching occurs between a downlink symbol and an uplink symbol, and in a case where uplink-downlink switching spacing corresponding to the first node is R symbols, determining the symbol for the uplink-downlink switching comprises one of the following:
determining that the symbol for the uplink-downlink switching is R downlink symbols before the uplink symbol; or
determining that the symbol for the uplink-downlink switching is R uplink symbols after the downlink symbol;
wherein R is a positive integer greater than or equal to 1.

16. A data transmission method, the method being applied to a second node and comprising:
configuring a signaling; and
sending the signaling to a first node, wherein the signaling is configured to instruct the first node to determine a slot format, wherein the slot format is used for data transmission;
wherein a symbol for an uplink-downlink switching is determined by the first node;
wherein the uplink-downlink switching occurs on a flexible symbol, uplink-downlink switching spacing corresponding to the first node is R symbols, and a number of flexible symbols is X;
in a case where R is less than or equal to X, the symbol for the uplink-downlink switching is determined as the flexible symbol; or in a case where R is greater than X, the symbol for the uplink-downlink switching is determined as one of the following:

the symbol for the uplink-downlink switching is determined as the flexible symbol and Y downlink symbols before the flexible symbol;

the symbol for the uplink-downlink switching is determined as the flexible symbol and Y uplink symbols after the flexible symbol;

in a case where a number of uplink symbols is greater than a number of downlink symbols within a preset length, the symbol for the uplink-downlink switching is determined as the flexible symbol and the Y uplink symbols after the flexible symbol; or in the case where the number of uplink symbols is greater than the number of downlink symbols within the preset length, the symbol for the uplink-downlink switching is determined as the flexible symbol and the Y downlink symbols before the flexible symbol, wherein the preset length is M slots, wherein M is a positive integer greater than or equal to 1, and R, X and Y are positive integers greater than or equal to 1.

17. A device, comprising
at least one processor; and
a memory configured to store at least one program,
wherein when executed by the at least one processor, the at least one program causes the at least one processor to perform the method according to claim 1.

18. A non-transitory storage medium storing a computer program, wherein when executing the computer program, a processor performs the method according to claim 1.

* * * * *